Figure 1:
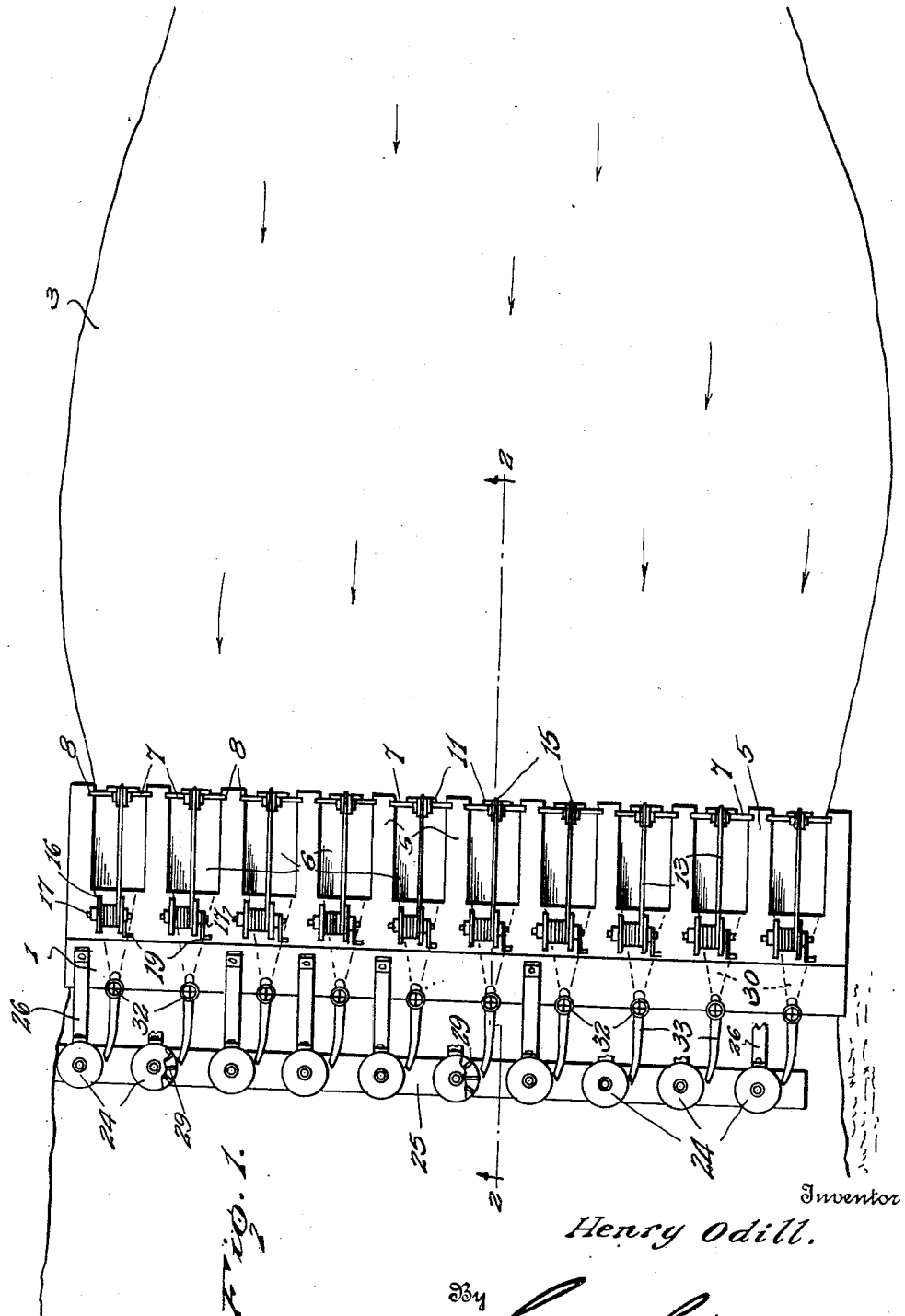

June 20, 1939.  H. ODILL  2,163,102
HYDROELECTRIC POWER PLANT
Filed Nov. 27, 1937  2 Sheets-Sheet 1

Inventor
Henry Odill.
By Lacey & Lacey,
Attorneys

June 20, 1939.  H. ODILL  2,163,102
HYDROELECTRIC POWER PLANT
Filed Nov. 27, 1937  2 Sheets-Sheet 2
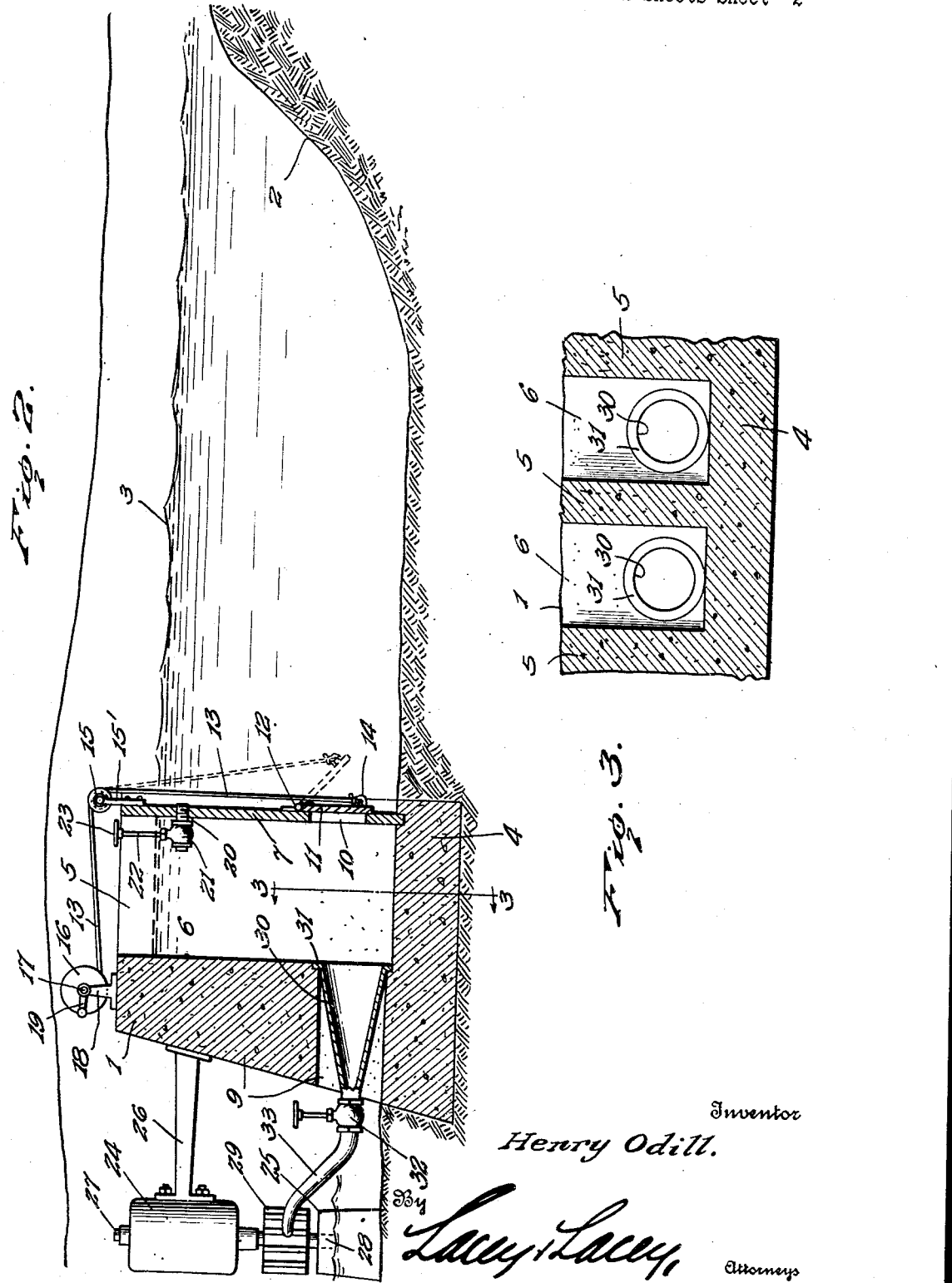
Inventor
Henry Odill.
By Lacey & Lacey,
Attorneys Patented June 20, 1939

2,163,102

UNITED STATES PATENT OFFICE 2,163,102

HYDROELECTRIC POWER PLANT

Henry Odill, Norway, Mich.

Application November 27, 1937, Serial No. 176,878

3 Claims. (Cl. 61—19)

This invention relates to a hydro-electric generator and consists briefly of a power dam erected across a flowing stream of water and means for delivering a jet of water under high pressure and velocity against a paddle wheel carried by the shaft of a generator mounted below the dam.

At the present time hydro-electric generating plants are constructed by means of dams erected across the bed of a river or other stream of water so that a head of water may be established and water is discharged through chutes or pipes for operating turbines by means of which generators are driven. Such an apparatus is effective for developing electric energy but since the turbines are merely driven by force or pressure exerted by the falling water a great deal of power which might be developed is lost.

Therefore, one object of the invention is to provide a hydro-electric power plant wherein the water instead of being delivered from an artificial lake back of the dam through chutes or pipes as a falling stream is delivered through the lower portion of the dam against a paddle wheel carried by the shaft of a generator. It will thus be seen that pressure created by the depth of water above the dam will be made use of instead of merely the force exerted by the falling water.

Another object of the invention is to so mount the generator below the dam and so form the discharge pipe through which water passes that the discharge pipe will be gradually reduced in diameter towards its outer end and thus cause the water to be delivered from the pipe under high pressure and also at very high velocity against the paddles of the generator paddle wheel.

It is another object of the invention to so dispose the outlet pipe that the water will be discharged therefrom above the level of water below the dam. It will thus be seen that since the pipe and the paddle wheel are above the natural level of the water below the dam the stream of water which is discharged will only be subjected to atmospheric resistance and will strike the blades of the paddle wheel with high force and cause the shaft of the generator to be turned rapidly and a great deal of electric energy developed.

Another object of the invention is to so construct the dam that it will be formed with a plurality of compartments from each of which leads a nozzle for delivering water at high velocity to a pipe extending towards a paddle wheel of a generator. By this arrangement a large number of generators may be operated at the same time and also all or only a selected number of the generators operated.

Another object of the invention is to provide improved means for controlling flow of water into the compartments of the dam and in addition permit water to be fed into the chambers through auxiliary inlets whereby the gates for the main water inlets may be very easily opened for initially filling the chambers.

The invention is illustrated in the accompanying drawings, wherein

Figure 1 is a top plan view of a hydro-electric power plant constructed in accordance with this invention, Figure 2 is a sectional view taken along the line 2—2 of Figure 1, and Figure 3 is a fragmentary sectional view taken along the line 3—3 of Figure 2.

When building the improved hydro-electric power plant in accordance with this invention, a dam, which is indicated in general by the numeral 1, is erected across the bed of a flowing stream of water, such as a river or the like. This dam is formed of concrete and reinforced in any desired manner, and upon referring to Figures 1 and 2, it will be seen that the dam is erected a suitable distance below a natural drop 2 in the bed of the stream creating a water fall or rapid. The base of the dam is counter-sunk in the bed of the stream and its ends are suitably anchored in cliffs or other high walls of the river bed and extends to such a height that it projects upwardly above the level of the water above the drop 2. When the dam has been erected, the water will be confined upstream between the dam and the top of the drop 2 and an artificial lake 3 will be formed having a depth corresponding to the vertical distance between the bed of the stream at the dam and the level of the surface of the water above the drop. The dam may be built any height desired above the level of the water above the drop 2 so that protection will be afforded in case of a freshet and the water prevented from flowing over the dam.

The base 4 of the dam extends rearwardly from the breast or body portion of the dam in a direction upstream, and from this base extension rise partitions or walls 5 which are also formed of concrete and integrally united to the body portion of the dam. These walls 5 constitute side walls of a series of chambers 6, the rear ends of which are closed by walls or partitions 7 which may be formed of wood, metal or any other material and have their side edge portions engaged in grooves or seats 8 formed vertically in the walls 5 near rear ends thereof. An opening or passage 9 of large diameter is formed through the dam at the front end of each of the chambers 6 and will be left unobstructed during erection of the dam so that water may flow through these openings and not interfere with proper setting of the concrete or prevent workmen from having easy access to various portions of the dam during building of the plant. The walls or partitions 7 are set in place after the concrete body of the dam and the walls or partitions 5 have been constructed.

Each of the partitions 7 is formed near its lower end with a water passage or opening 10 which is of sufficient dimension to allow water to flow into the chamber 6. In order to control flow of water through the opening 10 of the walls 7, each wall carries a door or gate 11 which is hinged to the outer face of the partition above the opening, as shown at 12. The weight of the doors will cause them to move toward a closed position and since they are mounted externally of the chambers at the upstream side of the dam the pressure of the water backed up to form the lake 8 will have a tendency to maintain the doors tightly closed. Therefore, water can be excluded from the chambers 6 when so desired. Cables 13 are secured to eyes 14 adjacent lower ends of the doors and these cables are carried upwardly and after being engaged with guide pulleys 15 carried by brackets 15' at the upper ends of the walls 7 or extended forwardly toward the front of the dam and wound upon drums 16. These drums have their shafts 17 rotatably mounted in bearing brackets or standards 18 rising from the body portion of the dam and each shaft carries at one end a crank 19 so that the drums may be individually turned to wind the cables thereon and draw the gate 11 upwardly to an opened position to allow water to flow into the chambers 6 and fill these chambers. It will thus be readily seen that the chambers may be filled with water to a level corresponding to the level of the water forming the lake 3. By closing certain of the gates and leaving other gates open as many chambers 6 as desired may be filled with water and the remaining chambers left empty. When a gate is subjected to the pressure of water forming the lake, it may be difficult to swing the gate upwardly to an open position. Therefore, each wall or partition 7 has been provided with a by-pass consisting of a short pipe or nipple 20 secured through the wall near the upper end thereof and carrying a valve 21 having a stem 22 of such length that the hand wheel 23 thereof can be easily reached by an attendant standing upon an adjacent wall 5. It will thus be seen that, when it is desired to admit water into a chamber 6, the valve 21 which is below the level of the water forming the lake can be opened and water will flow through this valve and the by-pass pipe 20 and thus fill the chamber until pressure within the chamber is sufficient to permit the gate 11 to be easily swung upwardly to an opened position. The water will then flow through the large opening 10 and quickly complete filling of the chamber and also maintain the water in the chamber at a height corresponding to the depth of the water forming the lake.

In order that electric energy may be developed by the power of water flowing from the dam, there has been provided electric generators 24 which correspond in number to the chambers 6. These generators are disposed vertically over a supporting bolster or foundation 25 which is also preferably formed of concrete and extends the full width of the dam or approximately the full width of the dam. The generators may be supported by any suitable supporting means but in the present illustration each has been shown secured to a strong metal arm 26 carried by the dam and extending from the front face thereof in a direction downstream. The lower ends of the shafts 27 of the generators are each mounted in a bearing 28 counter-sunk in the bolster 25, and lower end portions of the shafts are each equipped with a paddle wheel 29 which, when acted upon by a jet of water, will impart rotary motion to its generator shaft and set the generator in motion to develop electric energy. The bolster is of such depth that it projects upwardly above the surface of the water below the dam and, therefore, the paddle wheel 29 will be positioned at such a height that it will not be subjected to action of flowing water below the dam except the water which is intentionally directed against the paddle wheel.

After the dam has been erected, a nozzle 30 is set into each of the passages 9, and upon referring to Figures 2 and 3, it will be seen that each nozzle tapers from its inner end to its outer end and at its inner end is formed with an outstanding circumferentially extending flange 31 which engages the body portion of the dam about the inner end of the passage 9 through which the nozzle extends. The flanges are counter-sunk and will not only serve to brace the nozzles against longitudinal displacement in an outward direction but also assist in bracing them against shifting transversely. At their outer ends the nozzles carry valves 32 which are of a conventional gate valve construction, and from these valves extend short tubes which taper towards their outer ends and may be considered as extensions of the nozzles. These tubes extend upwardly from the valves above the level of the water below the dam and are so disposed with respect to the paddle wheels that jets of water discharged fom the pipes will strike the blades of the paddle wheels at the proper angle for rotating the paddle wheels and effecting operation of the generators. In view of the fact that a large number of chambers have been provided and a corresponding number of outlet nozzles for these chambers, the outlets will accommodate the water flowing into the lake 3 even when an abnormal quantity of water is flowing to the lake. It will thus be seen that no spillway is necessary and that all of the water can be made use of for driving generators and creating electric energy. All of the outlets may not be necessary to accommodate the full flow of water or it may be found that a greater efficiency will be produced by a reduced number in which case the gates 11 for certain of the chambers may be closed. The depth of the water in the chambers corresponds to the depth of the water in the lake and thus water can be forced through the nozzles at high pressure. It should also be noted that since the nozzles taper toward the valves and the tubes taper towards their outer ends the velocity of the streams of water discharged from the tubes or nozzle extensions 33 will be highly increased and since the jets of water are discharged from the nozzles through atmosphere against the paddle wheel the force of the jets of water will not be reduced as would be the case if the tubes 33 and the paddle wheel were under water. It will thus be seen that the generators will be operated at a high rate of speed and a large quantity of electric energy developed.

When it is desired to make repairs to any of the nozzles 30 or associated parts or clean certain of the chambers, it is merely necessary to close the gates 11 of the chambers to be cleaned or having the nozzles leading therefrom which must be repaired or replaced and these chambers will be emptied of water.

Having thus described the invention, what is claimed as new is:

1. In a hydro-electric plant, a dam for impounding water of a running stream and forming an artificial lake of predetermined depth, said dam having a body portion for extending across the stream and a plurality of walls extending from the body portion in an upstream direction and provide a plurality of water compartments, rear walls between the side walls of the water compartment adjacent the upstream ends thereof, each rear wall being formed near its lower end with a water passage through which water of the lake may flow to fill the chamber, closures for the water passages of said rear walls having actuating means accessible from the top of the dam, valve-controlled by-passes being provided adjacent upper ends of the rear walls whereby water of the lake may be initially fed into the compartments to a depth permitting easy opening of the closures for the water passages, generators having paddle wheels for operating the same mounted below the dam above the level of water below the dam, and nozzles extending from the water compartments through the body portion of the dam adjacent the bottoms of the water compartments and having extensions at their outer ends extending above the level of water below the dam in position for directing jets of water against the paddle wheels for driving the same.

2. In a hydro-electric plant, a dam for backing up water of a running stream and forming an artificial lake of a predetermined depth, said dam including a body portion having walls extending therefrom in an upstream direction and constituting side walls of a plurality of water compartments, rear walls for the water compartment mounted between the side walls and having water passages adjacent their lower ends, doors for closing the water passages hinged to the rear walls against the upstream faces thereof above the water passage for movement into and out of closing relation to the water passages, drums rotatably supported at the top of the body portion of the dam, guide pulleys carried by upper portions of the rear walls, cables extending upwardly from the lower ends of the closures and engaged with the guide pulleys and wound upon said drums whereby the closures may be drawn upwardly to an open position, the rear walls being provided with by-passages adjacent their upper ends for initially admitting water to the water compartments, closures for the by-passes having actuating means accessible from the top of the dam, generators each having a paddle wheel for operating the same mounted below the dam, and nozzles extending from the water compartments through the body portion of the dam and adapted to direct jets of water against the paddle wheels for setting the generators in motion.

3. In a hydro-electric plant, a dam for impounding water of a running stream to form an artificial lake of predetermined depth, said dam having a body portion and a plurality of walls extending upstream from the body portion and constituting side walls for a plurality of water compartments, rear walls for the water compartments having water passages through which water of the lake may fill the compartments, closures movable into and out of closing relation to the water compartments, the body portion of the dam being formed with openings extending therethrough from the water compartments, nozzles extending longitudinally through said openings, said nozzles being tapered toward their outer ends and at their inner ends fitting snugly within the inner end portions of the openings and formed with circumferential flanges engaging the body portion about the openings to maintain the nozzles in place through the openings, valves carried by outer ends of said nozzles, discharge tubes extending from said valves in a downstream direction and terminating above the level of water below the dam, and generators having paddle wheels for operating the same mounted above the level of water below the dam in position to be engaged and driven by jets of water discharged from the tubes.

HENRY ODILL.